United States Patent
Schlaf

(10) Patent No.: US 7,181,958 B2
(45) Date of Patent: Feb. 27, 2007

(54) HIGH ASPECT RATIO TIP ATOMIC FORCE MICROSCOPY CANTILEVERS AND METHOD OF MANUFACTURE

(75) Inventor: Rudiger Schlaf, Tampa, FL (US)

(73) Assignee: University of South Florida, Tampa, FL (US)

(*) Notice: Subject to any disclaimer, the term of this patent is extended or adjusted under 35 U.S.C. 154(b) by 81 days.

(21) Appl. No.: 10/905,045

(22) Filed: Dec. 13, 2004

(65) Prior Publication Data
US 2005/0241374 A1 Nov. 3, 2005

Related U.S. Application Data

(60) Provisional application No. 60/481,794, filed on Dec. 15, 2003.

(51) Int. Cl.
*H21J 27/00* (2006.01)
(52) U.S. Cl. .................................................... 73/105
(58) Field of Classification Search ............... 73/105; 250/306, 307
See application file for complete search history.

(56) References Cited

U.S. PATENT DOCUMENTS 6,512,235 B1 * 1/2003 Eitan et al. ............. 250/423 F
6,519,221 B1 * 2/2003 Manalis et al. ............. 369/126
6,743,408 B2 * 6/2004 Lieber et al. ............ 423/447.1

OTHER PUBLICATIONS

Hafner et al., Growth of Nanotubes for Probe Microscopy Tips, Nature, Apr. 29, 1999, p. 761-762, vol. 398.
Hall et al., Simple and Efficient Method for Carbon Nanotube Attachment to Scanning Probes and Other Substrates, Applied Physics Letters, Apr. 2003, p. 2506-2508, 82(15).
Kleckley et al., Letters to the Editor Fabrication of Multilayered Nanotube Probe Tips, Carbon, 2003, p. 833-836, vol. 41.
Katerina Moloni et al., Sharpened Carbon Nanotube Probes, pp. 1-8.

* cited by examiner

*Primary Examiner*—Robert Raevis
(74) *Attorney, Agent, or Firm*—Molly L. Sauter; Smith & Hopen, P.A.

(57) ABSTRACT

The present invention provides a method for the selective growth of single carbon nanotubes (CNT) on the tip apex of a conventional cantilever. Selective CNT growth is established by coating the backside of a cantilever, having a through-hole at a tip apex, with a catalyst material followed by a cover layer. The exposed catalyst at the bottom of the hole at the apex of the cantilever induces growth of a single CNT at this location.

13 Claims, 3 Drawing Sheets

Dimensions: 1μm long/50 nm wide

HIGH ASPECT RATIO TIP ATOMIC FORCE MICROSCOPY CANTILEVERS AND METHOD OF MANUFACTURE

CROSS-REFERENCE TO RELATED APPLICATION

This application claims priority to U.S. Provisional Patent Application No. 60/481,794, entitled: "Method for the Production of Carbon Nanotube (CNT) Atomic Force Microscope (AFM) Cantilevers Using a Near Field Scanning Optical Microscope", filed Dec. 15, 2003.

BACKGROUND

Tip-derived artifacts remain one of the chief limitations of atomic force microscopy (AFM) when attempting to measure sub-nanometer structures. Carbon nanotubes represent ideal structures for use as AFM tips because of their small diameter, high aspect ratio and high strength.

Atomic force microscopes (AFM) are widely used to image and characterize various surfaces and also by the integrated circuit industry as a metrology tool. A typical AFM probe consists of a silicon or silicon nitride cantilever with a pyramidal-shaped tip. This tip now can be made as small as 10–20 nm, offering reasonable resolution. However, the large cone angle of the tip (30–35 deg.) makes it difficult for probing narrow and deep features such as trenches in integrated circuit manufacturing. Another inherent negative feature of AFM probes known in the art is that the tip is brittle thus its use in applications is limited. The tips are subject to breakage or may become blunt after only a limited use.

Carbon nanotube (CNT) probes have become an attractive alternative to AFM cantilevers. The CNT probe not only offers extraordinary nanometer scale resolution but is also robust, due to its high strength and the ability to retain structural integrity even after deformation within elastic limit. Carbon nanotube probes known in the art are provided either by manual attachment of a carbon nanotube to the tip of the AFM cantilever or by growing a carbon nanotube through a lithography and chemical vapor deposition process from the ends of the silicon tip of the AFM probe. The process of manually attaching carbon nanotubes to the tip of an AFM is time consuming and selects against the smallest nanotubes, limiting the quality of tips. The processes known in the art for growing carbon nanotubes from the ends of the silicon tip of the AFM probe are inherently complex, requiring multiple processing steps, which are not easily reproducible.

Accordingly, what is needed in the art is a simple, reliable and inexpensive technique for the high yield assembly of carbon nanotubes onto atomic force microscopy probes.

SUMMARY OF INVENTION

The present invention provides a method for the selective growth of single carbon nanotubes (CNT) on the tip apex of a conventional cantilever. Conventional cantilevers for use with the present invention include, but are not limited to, near field scanning optical microscope probe cantilevers and hollow cantilevers as are known in the art.

In accordance with the present invention is provided a method for producing a carbon nanotube atomic force microscopy cantilever including the steps of providing an atomic force microscope cantilever having a backside and a frontside, the frontside further comprising a through-hole at a tip apex, applying a catalyst material layer to the backside of the atomic force microscope cantilever such that the catalyst material is exposed at the tip apex of the cantilever, the catalyst material enabling for carbon nanotube growth, applying a cover layer coincident with the catalyst material layer to the backside of the atomic force microscope cantilever, the cover layer inhibiting for carbon nanotube growth, and subjecting the cantilever to carbon nanotube growth in a chemical vapor deposition reactor resulting in the selective growth of a carbon nanotube at the tip apex of the cantilever.

In a particular embodiment, the atomic force microscopy cantilever is a near field scanning optical microscope probe.

The catalyst material in accordance with the present invention may be nickel, iron, cobalt or other material known in the art that is enabling for carbon nanotube growth.

The cover layer in accordance with the present invention may be chromium, or another material known in the art that is inhibiting for carbon nanotube growth.

In an additional embodiment, the present invention provides a method for producing a carbon nanotube atomic force microscopy cantilever including the steps of providing an atomic force microscope cantilever having a backside and a frontside, the frontside further comprising a tip apex, fabricating a through-hole at the tip apex of the cantilever, applying a catalyst material layer to the backside of the atomic force microscope cantilever such that the catalyst material is exposed at the tip apex of the cantilever, the catalyst material enabling for carbon nanotube growth, applying a cover layer coincident with the catalyst material layer to the backside of the atomic force microscope cantilever, the cover layer inhibiting for carbon nanotube growth and subjecting the cantilever to carbon nanotube growth in a chemical vapor deposition reactor resulting in the selective growth of a carbon nanotube at the tip apex of the cantilever. As such, the atomic force microscopy cantilever in accordance with this embodiment may be a hollow cantilever probe or other ATM probe known in the art that does not include a prefabricated through-hole at the tip apex.

In a particular embodiment utilizing a cantilever without a prefabricated through-hole at the tip, a focused ion beam is applied to the tip apex of the cantilever to fabricate the through-hole prior to the application of the catalyst material and the cover material.

As such, the present invention provides a carbon nanotube atomic force microscope cantilever comprising, an atomic force microscope cantilever having a backside and a frontside, the frontside further comprising a through-hole at a tip apex, a catalyst material layer applied to the backside of the atomic force microscope cantilever such that the catalyst material is exposed at the tip apex of the cantilever, the catalyst material enabling for carbon nanotube growth, a cover layer applied coincident with the catalyst material layer to the backside of the atomic force microscope cantilever, the cover layer inhibiting for carbon nanotube growth, and a carbon nanotube extending from the tip apex of the cantilever, the carbon nanotube grown by subjecting the cantilever to chemical vapor deposition.

A near field scanning optical microscopy probe, a hollow probe, or other probes known in the art for AFM may be used in the fabrication of the carbon nanotube atomic force microscope cantilever is accordance with the present invention. A through-hole of the required dimensions will be fabricated in probes that do not include a pre-fabricated through-hole at the tip apex.

Accordingly, the present invention provides a simple, reliable and inexpensive technique for the high yield assembly of carbon nanotubes onto atomic force microscopy probes that overcomes the limitations known in the prior art.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

In accordance with the present invention is provided a method to initiate selective growth of a single carbon nanotube (CNT) on the apex of an AFM probe.

Figure 1:
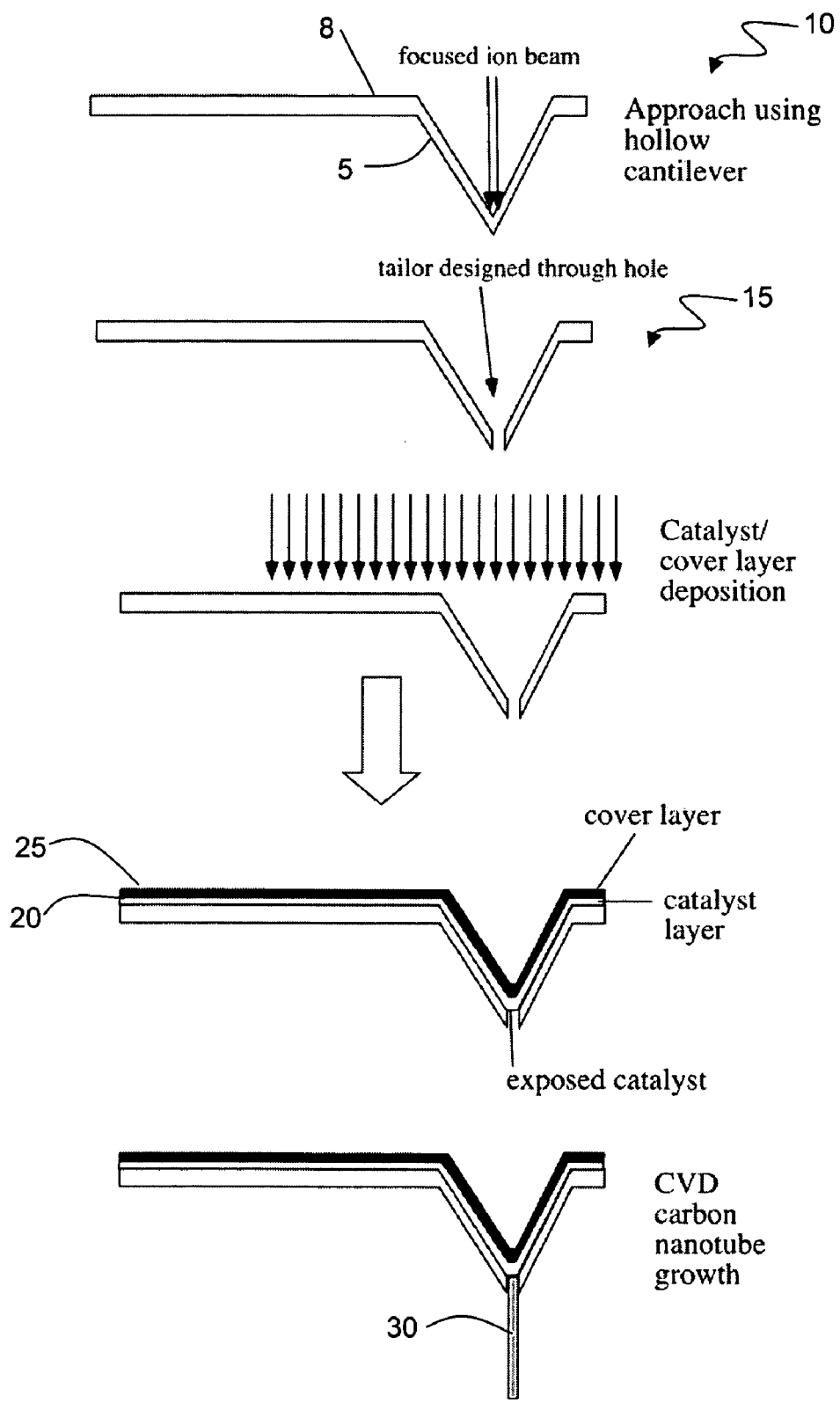
FIG. 1 illustrates a schematic of the CNT cantilever growth process utilizing hollow cantilevers in accordance with the present invention.

With reference to FIG. 1, a particular embodiment is illustrated utilizing a hollow cantilever. As is known in the art, a hollow cantilever does not have a through-hole at the tip apex. The hollow cantilever as shown is identified as having a frontside 5 and a backside 8. A focused ion beam 10 is utilized to tailor design a through-hole at the tip apex of the hollow cantilever 15. A catalyst material layer 20 is then applied to the backside of the atomic force microscope cantilever such that the catalyst material is exposed at the tip apex of the cantilever, the catalyst material is enabling for carbon nanotube growth. A cover layer 25 coincident with the catalyst material layer is then applied to the backside of the atomic force microscope cantilever, the cover layer being inhibiting for carbon nanotube growth. The cantilever and associated material layers is then subjected to a chemical vapor deposition process, thereby exposing the catalyst at the tip apex to the chemical vapor deposition, resulting in the selective growth of a carbon nanotube 30 at the tip apex of the cantilever. The growth process depends upon the presence of the catalyst material, i.e. selective growth of the CNT will occur at the apex of the probe tip through the fabricated hole.

Figure 2:
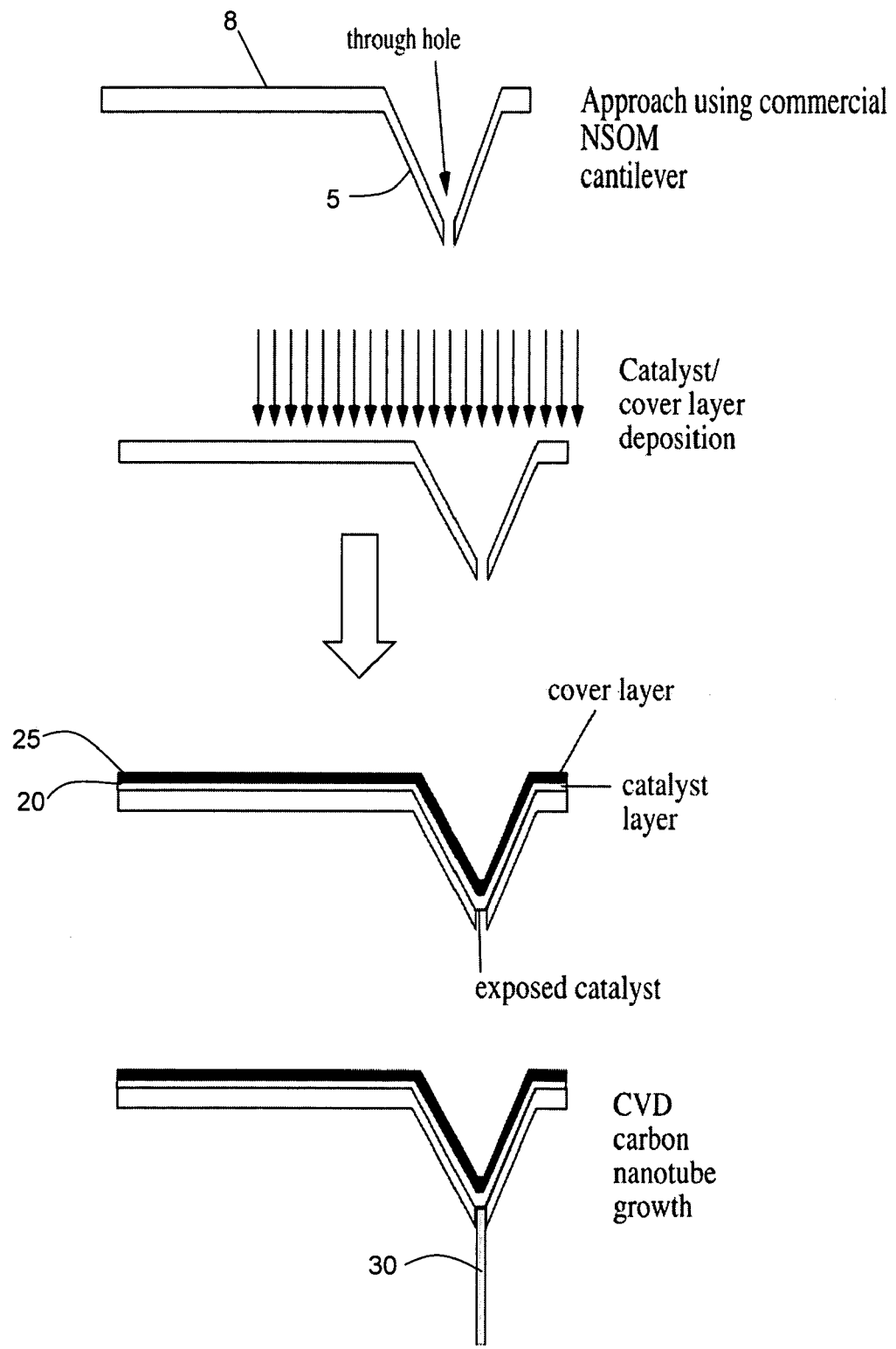
FIG. 2 illustrates a schematic of the CNT cantilever growth process utilizing commercial NSOM probes in accordance with the present invention.

In accordance with an additional embodiment, the present invention takes advantage of the through-hole present at the apex of near field scanning optical microscopy (NSOM) probe as shown in FIG. 2. The goal is to produce an atomic force microscopy cantilever with a well-defined CNT protruding from the apex for use in Critical Dimension Metrology (CDM). As shown in FIG. 2, the step of fabricating a through-hole at the tip apex of the cantilever utilizing focused ion beam technology is eliminated when the cantilever is provided with a prefabricated through-hole such as in the case of an NSOM probe.

In accordance with the present invention the coating of the backside of the probe with a thin layer of CNT growth catalyst may be accomplished through deposition of Ni, Fe, Co, or other materials enabling for carbon nanotube growth. Additionally, the cover layer may be fabricated from a deposition process utilizing Cr or other materials known in the art capable of inhibiting carbon nanotube growth.

Figure 3:
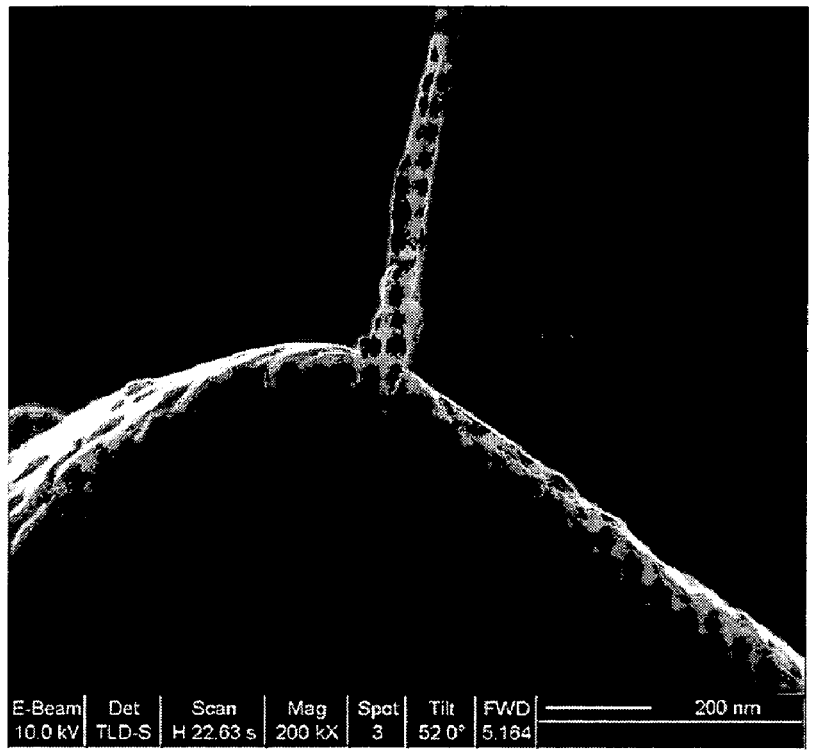
FIG. 3 illustrates a single freestanding CNT cantilever produced from a NSOM probe in accordance with the present invention.
Figure 3:
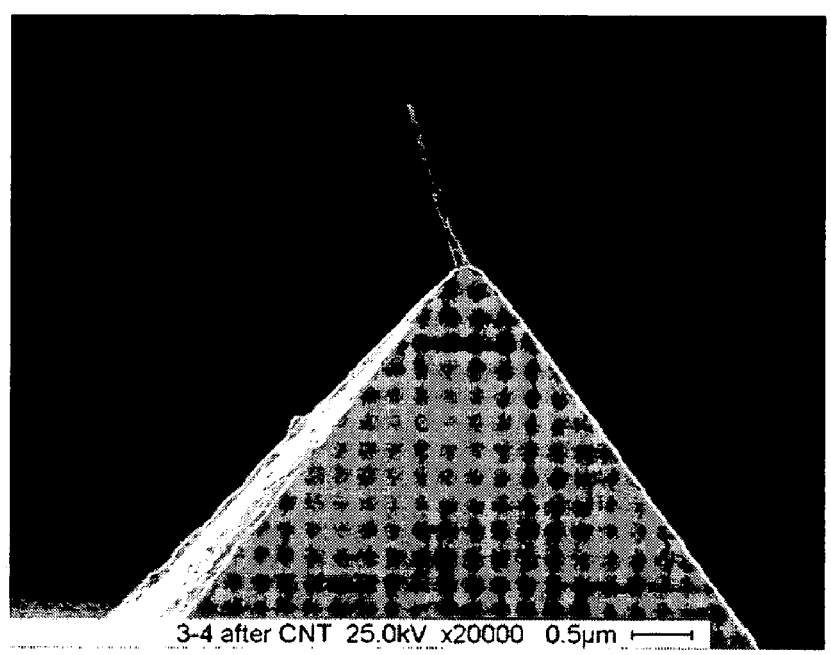

FIG. 3 illustrates a single freestanding CNT cantilever produced from a NSOM probe in accordance with the present invention.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for producing a carbon nanotube atomic force microscopy cantilever, comprising the steps of:
   providing an atomic force microscope cantilever having a backside and a frontside, the frontside further comprising a trough-hole at a tip apex;
   applying a catalyst material layer to the backside of the atomic force microscope cantilever such that the catalyst material is exposed at the tip apex of the cantilever, the catalyst material enabling for carbon nanotube growth;
   applying a cover layer coincident with the catalyst material layer to the backside of the atomic force microscope cantilever, the cover layer inhibiting for carbon nanotube growth; and
   subjecting the cantilever to carbon nanotube growth in a chemical vapor deposition reactor resulting in the selective growth of a carbon nanotube at the tip apex of the cantilever.

2. The method of claim 1, wherein the atomic microscopy cantilever is a near field scanning optical microscope probe.

3. The method of claim 1, wherein the catalyst material is selected from the group consisting of nickel, iron and cobalt.

4. The method of claim 1, wherein the cover layer is chromium.

5. A method for producing a carbon nanotube atomic force microscopy cantilever, comprising the steps of:
   providing an atomic force microscope cantilever having a backside and a frontside, the frontside further comprising a tip apex;
   fabricating a through-hole at the tip apex of the cantilever;
   applying a catalyst material layer to the backside of the atomic force microscope cantilever such that the catalyst material is exposed at the tip apex of the cantilever, the catalyst material enabling for carbon nanotube growth;
   applying a cover layer coincident with the catalyst material layer tote backside of the atomic force microscope cantilever, the cover layer inhibiting for carbon nanotube growth; and
   subjecting the cantilever to carbon nanotube growth in a chemical vapor deposition reactor resulting in the selective growth of a carbon nanotube at the tip apex of the cantilever.

6. The method of claim 5, wherein the catalyst material is selected from the group consisting of nickel, iron and cobalt.

7. The method of claim 5, wherein the cover layer is chromium.

8. The method of claim 5, wherein the step of fabricating a through-hole at the tip apex of the cantilever further comprising applying a focused ion beam to the tip apex of the cantilever to fabricate the through-hole.

9. The method of claim 5, wherein the atomic force microscopy cantilever is a hollow cantilever.

10. A carbon nanotube atomic force microscope cantilever comprising:
- an atomic force microscope cantilever having a backside and a frontside, the frontside further comprising a through-hole at a tip apex;
- a catalyst material layer applied to the backside of the atomic force microscope cantilever such that the catalyst material is exposed at the tip apex of the cantilever, the catalyst material enabling for carbon nanotube growth;
- a cover layer applied coincident with the catalyst material layer to the backside of the atomic force microscope cantilever, the cover layer inhibiting for carbon nanotube growth; and
- a carbon nanotube extending from the tip apex of the cantilever, the carbon nanotube grown by subjecting the cantilever to chemical vapor deposition.

11. The cantilever of claim 10, wherein the atomic force microscopy cantilever is a near field scanning optical microscope probe.

12. The cantilever of claim 10, wherein the catalyst material is selected from the group consisting of nickel, iron and cobalt.

13. The cantilever of claim 10, wherein the cover layer is chromium.

* * * * *